March 24, 1964 S. A. MAXWELL 3,126,082

COIN-FREED MECHANISM

Filed March 26, 1962 6 Sheets-Sheet 1

INVENTOR
STEWART ALFRED MAXWELL

BY A. Yates Dowell Jr. & II
ATTORNEYS

INVENTOR
STEWART ALFRED MAXWELL
BY [signature]
ATTORNEYS

March 24, 1964 S. A. MAXWELL 3,126,082

COIN-FREED MECHANISM

Filed March 26, 1962 6 Sheets-Sheet 3

INVENTOR
STEWART ALFRED MAXWELL

BY [signature]
ATTORNEYS

INVENTOR
STEWART ALFRED MAXWELL

BY [signature]
ATTORNEYS

March 24, 1964 S. A. MAXWELL 3,126,082

COIN-FREED MECHANISM

Filed March 26, 1962 6 Sheets-Sheet 5

INVENTOR
STEWART ALFRED MAXWELL
BY
[signature]
ATTORNEYS

March 24, 1964 S. A. MAXWELL 3,126,082

COIN-FREED MECHANISM

Filed March 26, 1962

6 Sheets-Sheet 6

INVENTOR
STEWART ALFRED MAXWELL

BY [signature]
ATTORNEYS

United States Patent Office 3,126,082

Patented Mar. 24, 1964

3,126,082
COIN-FREED MECHANISM

Stewart Alfred Maxwell, Walsall, England, assignor to Fisher & Ludlow Limited, Birmingham, England, a company of England Filed Mar. 26, 1962, Ser. No. 182,489
2 Claims. (Cl. 194—94)

This invention relates to coin-freed mechanism of the kind which is adapted to permit the delivery of an article from a vending machine in response to the insertion of the correct coinage into the machine.

A disadvantage of coin vending machines is the modification which must be made to the machines in the event of an alteration in the price of the commodity dispensed.

The object of the present invention is to provide a new or improved construction of coin-freed mechanism which can be used to obviate the necessity for extensive modification to the machine in the event of an increase in the price of the commodity.

According to the present invention we provide, in or for a coin-freed vending machine, a coil-freed mechanism comprising a release member adapted for movement between two positions, and rotatable release means having peripheral portions located at different distances from the axis of rotation so as to provide a projection which in one angular position of the release means extends into the path of travel of the release member to prevent movement of the release member into one of its positions and which in another angular position of the release means is clear of the path of travel to permit such movement of the release member.

Figure 1:
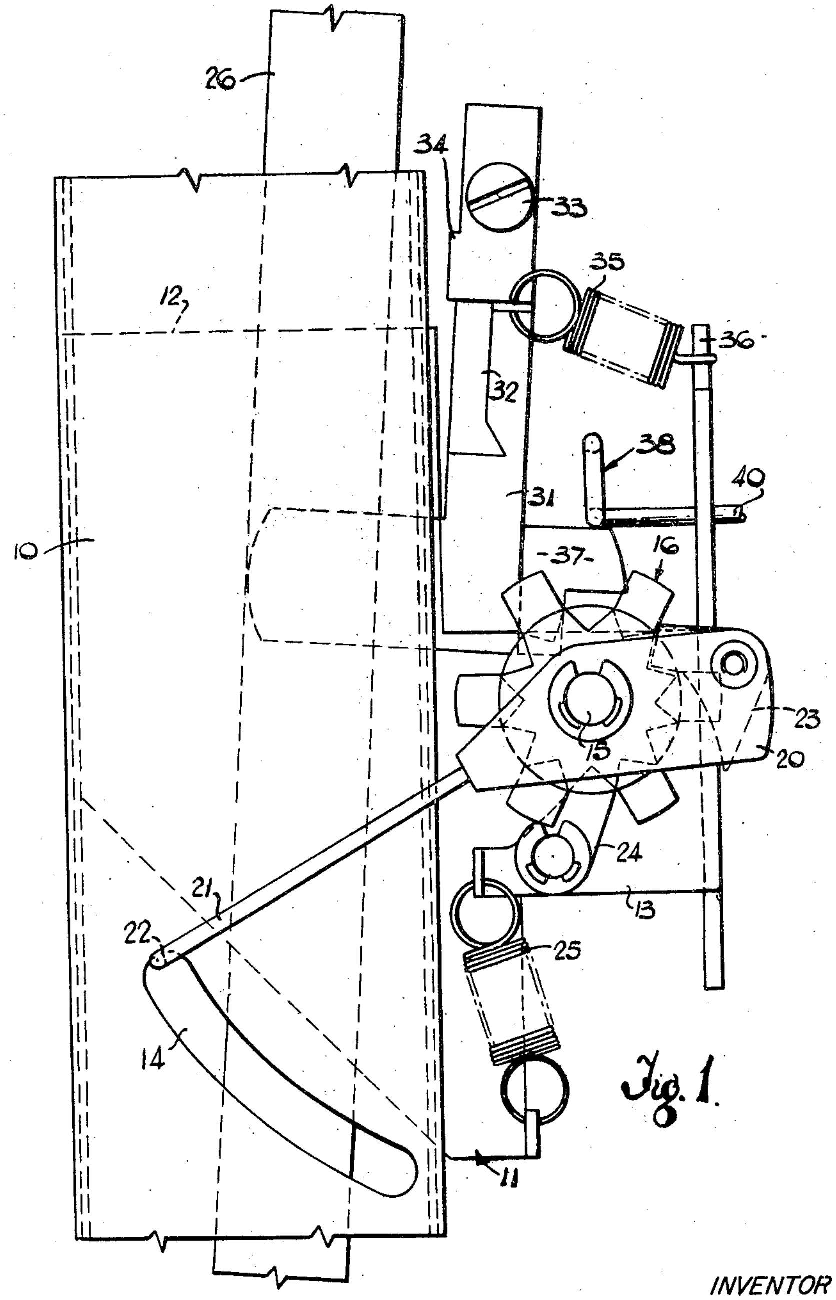
Figure 2:
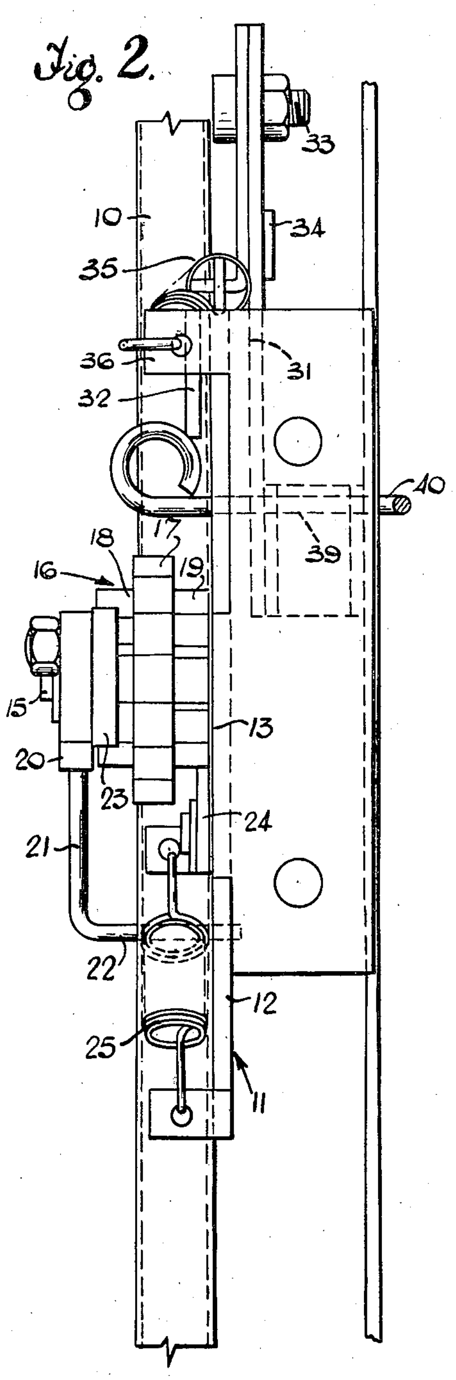
Figure 5:
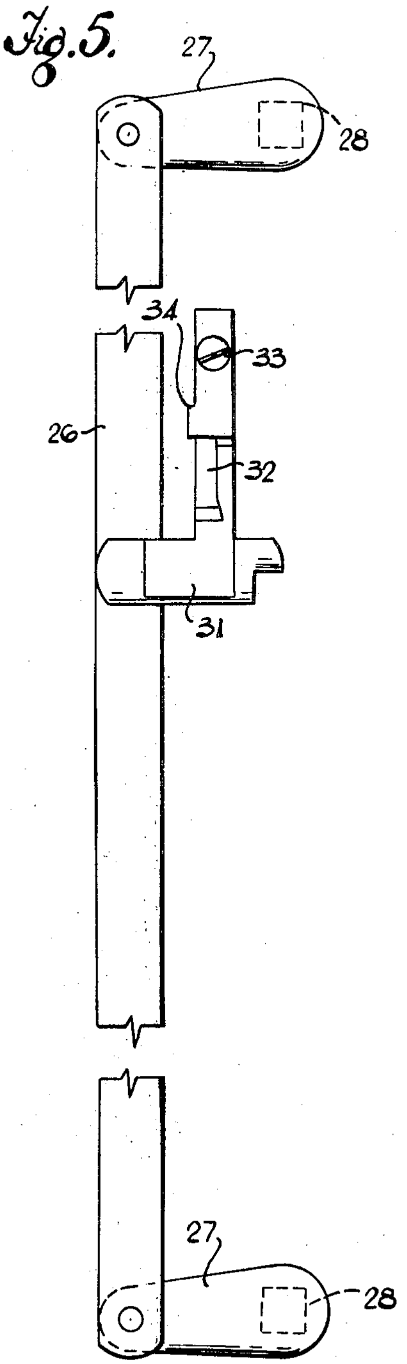
Figure 3:
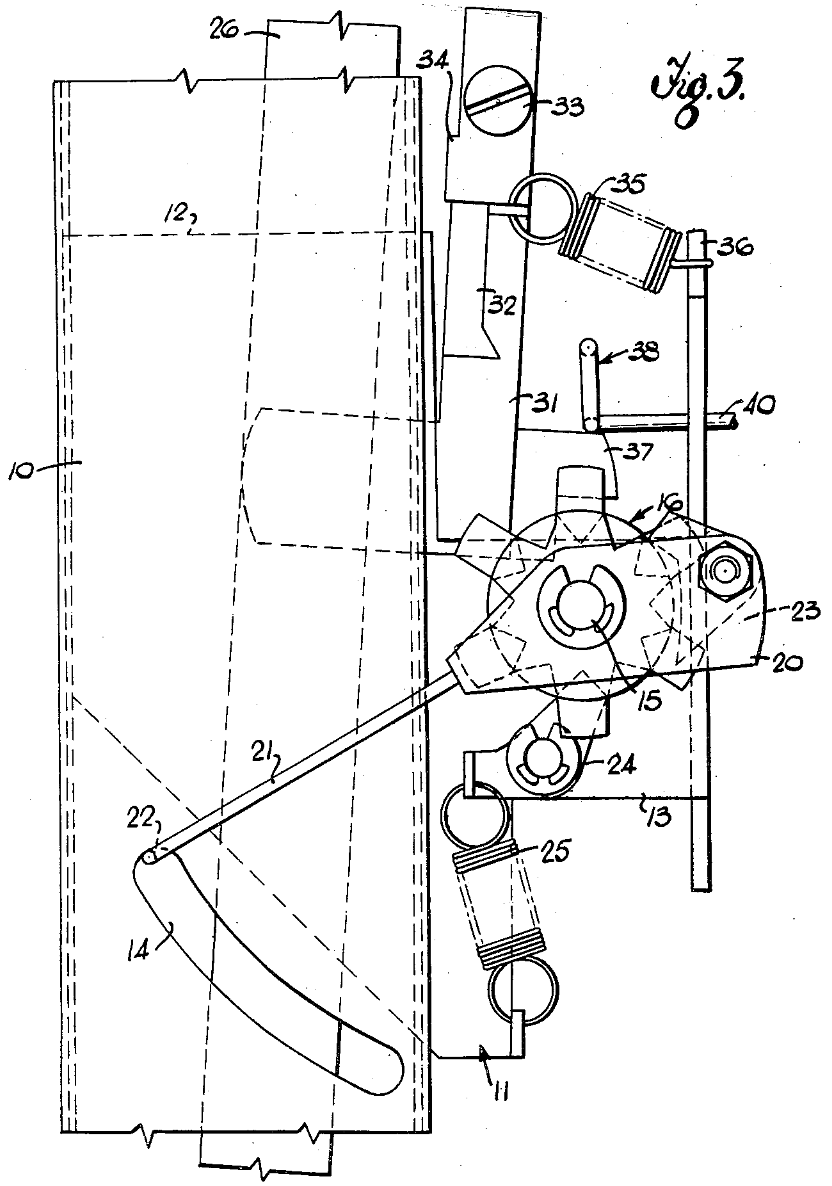
Figure 4:
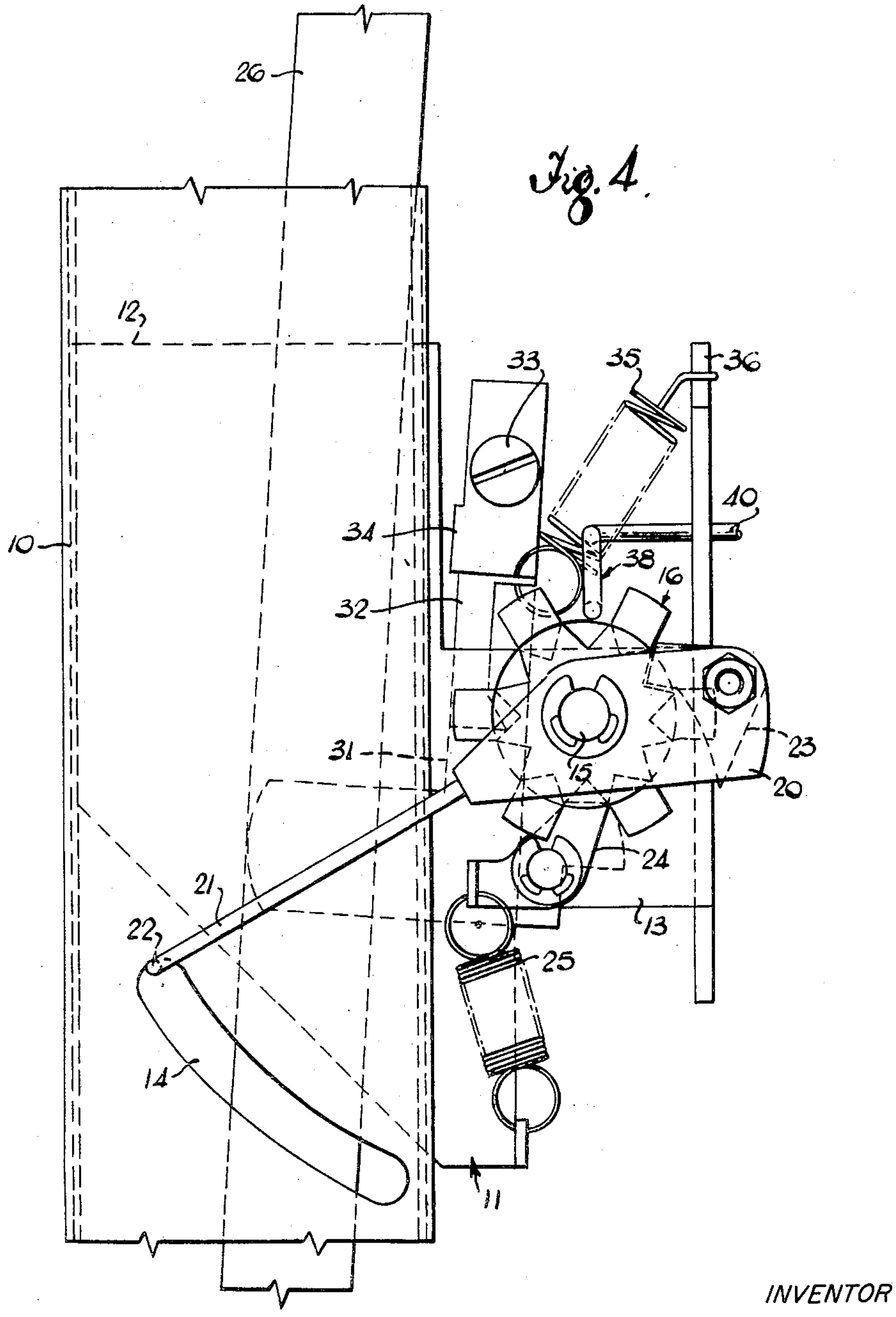
Figure 6:
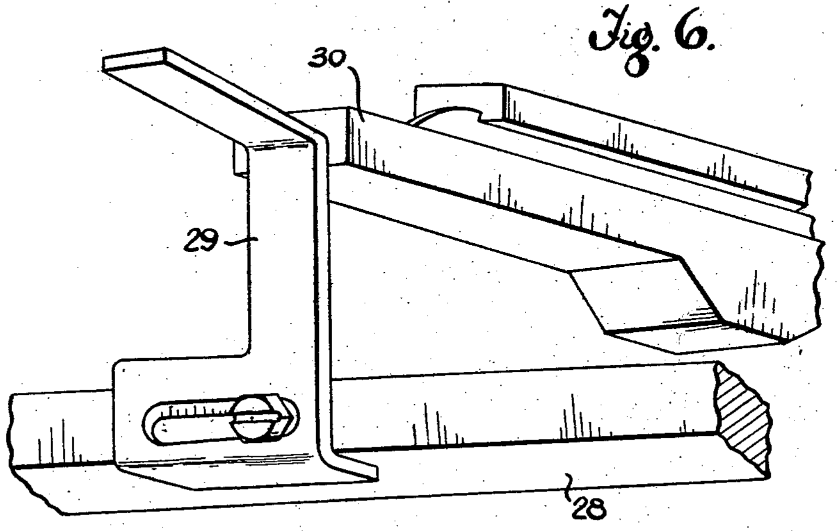
Figure 15:
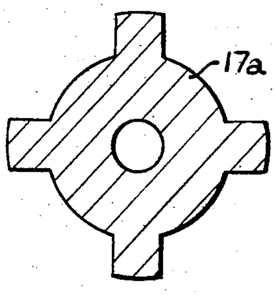
Figure 16:
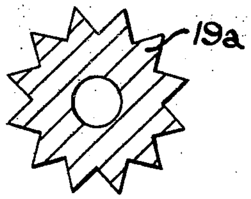
Figure 7:
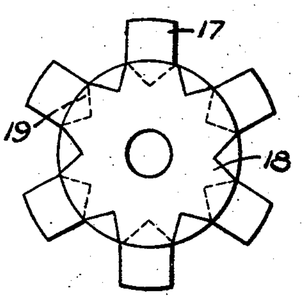
Figure 8:
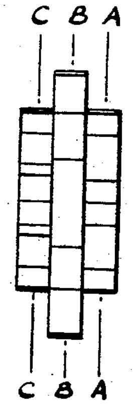
Figure 9:
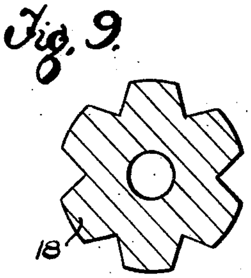
Figure 10:
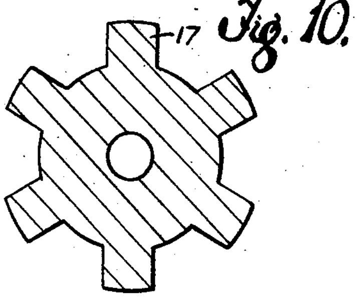
Figure 11:
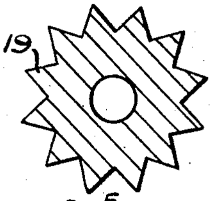
Figure 12:
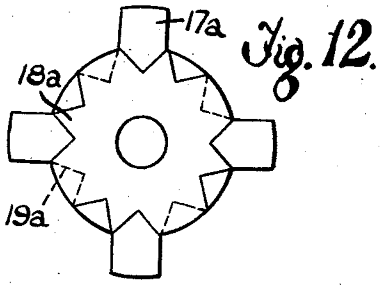
Figure 13:
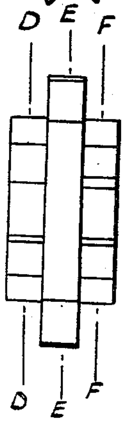
Figure 14:
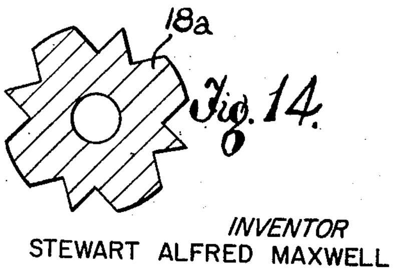

The invention will now be described with reference to the accompanying drawings in which:

FIGURE 1 is a front elevation to an enlarged scale of one form of mechanism constructed in accordance with the invention in the inoperative condition, FIGURE 2 is a side elevation of the mechanism of FIGURE 1, FIGURE 3 is a front elevation showing the mechanism after actuation by a coin, FIGURE 4 is a front elevation showing the mechanism after operation of an ejector of a vending machine of which the mechanism forms a part, FIGURE 5 shows, full size, the indexing bar assembly, FIGURE 6 is an enlarged detail perspective view of the parts which operate the indexing bar assembly, FIGURE 7 is a front elevation of the ratchet assembly, FIGURE 8 is a side elevation of the ratchet assembly, FIGURE 9 is a section on the line A—A of FIGURE 8, FIGURE 10 is a section on the line B—B of FIGURE 8, FIGURE 11 is a section on the line C—C of FIGURE 8, FIGURE 12 is a front elevation of another form of ratchet assembly, FIGURE 13 is a side elevation of the ratchet assembly of FIGURE 12, FIGURE 14 is a section on the line D—D of FIGURE 13, FIGURE 15 is a section on the line E—E of FIGURE 13, and FIGURE 16 is a section on the line F—F of FIGURE 13.

Referring first to FIGURES 1 and 2, the mechanism includes a coin chute 10 welded to a bracket 11 which comprises a major part 12 to which the back of the chute is welded, and a smaller rectangular part 13 at one side of the major part 12. The chute 10 and the part 12 of the bracket are cut out to define an arcuate slot 14 and the smaller rectangular part 13 of the bracket is provided with a perpendicularly projecting shaft 15 at the centre of curvature of the slot 14. The radius from the shaft 15 to the centre of the slot 14 is inclined at approximately 45° below the horizontal. On the shaft is rotatably mounted a ratchet assembly 16 which comprises, as most clearly shown in FIGURES 7 to 11, a pair of ratchet wheels on either side of, and integral with, a central toothed wheel 17. The central toothed wheel 17 and the front ratchet wheel 18 each have six teeth and the rear ratchet wheel 19 has twelve teeth. The teeth of the front ratchet wheel 18 are disposed in register with the teeth of the central wheel 17 and both sets of teeth are provided with flats. The teeth of the central wheel project beyond those of the two ratchet wheels.

Also rotatably mounted on the shaft 15 is an actuator plate 20 having an actuator rod 21 extending radially of the shaft 15 across the outside of the chute 10 from a point on the periphery of the plate 20. The end 22 of the actuator rod 21 is bent to project into the arcuate slot 14 and across the chute 10. Pivotally mounted on the actuator plate 20 at a point remote from the rod 21 is a driving pawl 23 adapted to engage the front ratchet wheel 18 and rotate the ratchet assembly in a counter-clockwise direction with respect to FIGURE 1. A retaining pawl 24 is pivoted to the part 13 of the bracket 11 below the ratchet assembly 16 and is urged into engagement with the rear ratchet wheel 19 by a tension spring 25, the retaining pawl 24 permitting counter-clockwise rotation of the ratchet assembly and preventing clockwise rotation.

The mechanism can be used in many types of coin-freed vending machines but will be described, by way of example, as applied to a cigarette vending machine which is of known type and which will therefore not be described in detail. Briefly, however, the machine comprises a number of vertically disposed magazines, each adapted to contain a stack of packets of cigarettes, the magazines being arranged in two horizontal rows one above the other. At the base of each magazine is an ejector which is slidably mounted so that it can be pulled forwards and then returned to its original position, the return movement effecting rearward ejection of the lowest packet of the stack, the packet falling along a chute to a delivery position at the front of the machine.

The mechanism would be disposed adjacent to the right-hand side wall of the magazine assembly near the front edge thereof with the plane of the bracket 11 parallel with the plane of the side wall. Behind the bracket 11 is an indexing bar 26 which at its upper and lower ends is pivotally connected to crank arms 27. These crank arm are non-rotatably connected to shafts 28 of square or rectangular cross-section extending horizontally across the machine and disposed just below the upper and lower rows of magazines. A number of arms 29 equal to the number of magazines in each row are mounted on the shafts 28 and these arms co-operate with projecting parts 30 of the ejectors.

A bracket 31 is secured to the indexing bar 26 and a finger 32 is pivotally carried on a pin 33 secured to the bracket 31. The finger 32 has a small projection 34 which is normally urged against the bracket 31 by a tension spring 35 located between the finger 32 and a flange 36 on the bracket 11. The bracket 31 has a ledge 37 which in the inoperative position shown in FIGURE 1 is disposed above the shaft 15 and which supports the end 39 of a release member 38. This end 39 projects perpendicularly from the main portion 40 which is mounted for rotation about its own axis, this rotation being caused when the supporting ledge 37 is lowered to allow the end 39 to fall.

Rotation beyond a certain limit of the main portion 40 of the release member 38 is arranged in any convenient manner to prevent complete operation of the ejectors, thereby preventing delivery of a packet from a magazine. For example, rotation of the release member may cause a dog or tooth to be projected into the path of travel of a member which is movable with the ejector, thus preventing further movement of the ejector.

The operation of the mechanism is as follows:

The mechanism is normally in the position shown in FIGURES 1 and 2. If it is attempted to pull out an ejector, initial movement thereof causes the projecting part 30 of the ejector to engage an arm 29 on the shaft 28 (see FIGURE 6) and thus to rotate the shaft. This rotation and the accompanying rotation of the crank arms 27 produce downward movement of the indexing bar 26 and downward movement of the ledge 37, thus allowing the release member 38 to pivot about the axis of the main portion 40 thereof. As stated above, this action prevents further movement of the ejector.

It will be seen from FIGURE 1 that the greatest proportion of the area of the actuator plate 20 lies to the right-hand side of the shaft 15. In fact, the centre of gravity of the actuator rod 21, plate 20 and driving pawl 23 is to the right of the pivotal axis, and normally therefore the end 22 of the actuator rod 21 engages the upper end of the arcuate slot 14. However, if the correct coin is inserted in the machine and is accepted by an appropriate coin selector device, the coin falls down the chute 10 and engages the end 22 of the actuator rod and the weight of the coin is sufficient to depress the actuator rod and to rotate the actuator plate 20, the engagement of the driving pawl 23 with the front ratchet wheel 18 producing counter-clockwise rotation of the ratchet assembly 16 through 30°.

After rotating the actuator rod the coin falls past the end of the rod and the actuator plate 20 rotates clockwise towards its original position, the retaining pawl 24 preventing clockwise rotation of the ratchet assembly. The mechanism thus attains the position of FIGURE 3, with one of the teeth of the central wheel 17 disposed above the shaft 15 and directly below the release member 38 with the driving pawl 23 engaging the flat on one of the teeth of the front ratchet wheel 18. The immediate insertion of another coin in the machine would not rotate the ratchet assembly 16 further, since the driving pawl 23 would merely wipe over the flat on the tooth with which it is in contact.

With the mechanism in the position of FIGURE 3, operation of an ejector would again cause the indexing bar 26 to move downwardly, thus allowing pivotal movement of the release member 38. The pivotal movement is limited, however, since the end 39 will come to rest on the uppermost tooth of the central wheel 17. Forward movement of the ejector will not therefore be terminated and can be completed to deliver a packet from the machine. During the forward movement of the ejector the indexing bar 26 moves downwards sufficiently far to cause the finger 32 to engage a tooth of the rear ratchet wheel 19 and to produce further rotation of the ratchet assembly 16 through 30° to the position of FIGURE 4. Upon returning the ejector to its original position, the indexing bar 26 is raised so that the mechanism is once again in the position of FIGURE 1, the pivotal mounting of the finger 32 on the bracket 31 preventing obstruction to upward movement of the indexing bar by the tooth immediately above the tooth which has just been engaged by the finger.

The mechanism provided by the invention is primarily intended for use as a supplementary mechanism in a vending machine having an existing coin-freed mechanism, the machine vending articles which are sometimes subject to small increases in price, such as cigarettes. When an increase in price occurs it is often necessary to extensively modify or completely replace the coin selector mechanism. For example, a commodity may be sold at 25 cents and the machine will then include a coin selector mechanism which accepts 25 cent pieces, if now the price of the commodity is increased to 30 cents the machine can be provided with a supplementary mechanism constructed in accordance with the present invention and adapted to operate upon the insertion of a 5 cent piece thus obviating the necessity for the coin selector mechanism to be replaced by one which accepts a higher denomination of coinage.

The mechanism can be readily modified for operation by two coins instead of one simply by replacing the ratchet assembly 16 by the ratchet assembly of FIGURES 12 to 16. The front ratchet wheel 18*a* has four teeth which are provided with flats and four pointed teeth arranged alternately with the flat teeth. The central wheel 17*a* has four teeth and the rear ratchet wheel 19*a* again has twelve teeth. The method of operation is similar to that described above except that two coins must pass successively down the chute 10 in order to bring one of the teeth to a position vertically above the shaft 15 in which an ejector can be operated.

Similarly the mechanism can be adapted for operation by three coins by the use of a ratchet assembly having a central wheel with three teeth and a front ratchet wheel with three flat teeth between each adjacent pair of which are arranged two pointed teeth, so that the complete sequence of operations rotates the ratchet assembly through 120°, compared with the 60° rotation of the ratchet assembly of FIG. 7 and the 90° rotation of the assembly of FIG. 12.

The mechanism is eminently suitable for use as a supplementary mechanism in the manner described above since it is small and compact (the scale of FIGURE 1 is twice full size) and can therefore be fitted to a machine without necessitating much modification to the machine.

What I claim then is:

1. A coin freed mechanism, in or for a coin freed vending machine, which includes:

(*a*) a release member adapted for movement between a first position and a second position, a vending operation of the machine being permitted when the release member is in its first position and prevented when the release member is in its second position, (*b*) a toothed wheel, a first ratchet wheel and a second ratchet wheel mounted on a common shaft, the toothed wheel being adapted for rotation together with the ratchet wheels between a first angular position, in which the teeth of the toothed wheel are clear of the path of travel of the release member so as to permit movement of the release member into the space between two adjacent teeth of the toothed wheel and into its second position, and a second angular position in which a tooth of the toothed wheel extends into the path of travel of the release member so as to prevent movement of the release member from its first to its second position, (*c*) a first pawl adapted, in response to the insertion of the appropriate coinage into the machine, to engage the first ratchet wheel and to rotate the toothed wheel together with the ratchet wheels from the first angular position to the second angular position in a forward direction, (*d*) a second pawl adapted to engage the first ratchet wheel so as to prevent rotation of the toothed wheel together with the ratchet wheels in the reverse direction, (*e*) a finger adapted, in response to a vending operation of the machine to engage the second ratchet wheel and to rotate the toothed wheel together with the ratchet wheels from the second angular position to the first angular position, again in a forward direction, and (*f*) a ledge, adapted for movement with said finger, adapted when the machine is in an inoperative position to support the release member in its first position and adapted upon a vending operation of the machine to move so as to permit movement of the release member from its first position towards its second position.

2. A coin freed vending machine which includes a manually actuated article delivery mechanism and a coin freed mechanism which includes:

(a) a release member adapted for movement between a first position and a second position, a vending operation of the machine being permitted when the release member is in its first position and prevented when the release member is in its second position, (b) a toothed wheel, a first ratchet wheel and a second ratchet wheel mounted on a common shaft, the toothed wheel being adapted for rotation together with the ratchet wheels between a first angular position, in which the teeth of the toothed wheel are clear of the path of travel of the relase member so as to permit movement of the release member into the space between two adjacent teeth of the toothed wheel and into its second position, and a second angular position in which a tooth of the toothed wheel extends into the path of travel of the release member so as to prevent movement of the release member from its first to its second position, (c) a first pawl adapted, in response to the insertion of the appropriate coinage into the machine, to engage the first ratchet wheel and to rotate the toothed wheel together with the ratchet wheels from the first angular position to the second angular position in a forward direction, (d) a second pawl adapted to engage the first ratchet wheel so as to prevent rotation of the toothed wheel together with the ratchet wheels in the reverse direction, (e) a bracket operatively coupled to the article delivery mechanism, (f) a finger connected to said bracket, the finger being adapted in response to a vending operation of the machine to engage the second ratchet wheel and to rotate the toothed wheel together with the ratchet wheels from the second angular position to the first angular position again in a forward direction.

(g) a ledge connected to said bracket, adapted when the machine is in an operative position to support the release member in its first position and adapted upon actuation of the article delivery mechanism to move so as to permit movement of the release member from its first position towards its second position.

References Cited in the file of this patent

UNITED STATES PATENTS

| | | |
|---|---|---|
| 2,991,867 | Schuller | July 11, 1961 |
| 3,053,370 | Schuller | Sept. 11, 1962 |